No. 673,722. Patented May 7, 1901.
T. T. MOULTON.
COMBINED WATER COOLER AND FILTER.
(Application filed Nov. 1, 1900.)
(No Model.) 4 Sheets—Sheet 1.

No. 673,722. Patented May 7, 1901.
T. T. MOULTON.
COMBINED WATER COOLER AND FILTER.
(Application filed Nov. 1, 1900.)
(No Model.) 4 Sheets—Sheet 2.

Witnesses
Inventor
T. T. Moulton
By H. B. Willson & Co.
Attorneys

No. 673,722. Patented May 7, 1901.
T. T. MOULTON.
COMBINED WATER COOLER AND FILTER.
(Application filed Nov. 1, 1900.)
(No Model.) 4 Sheets—Sheet 3.
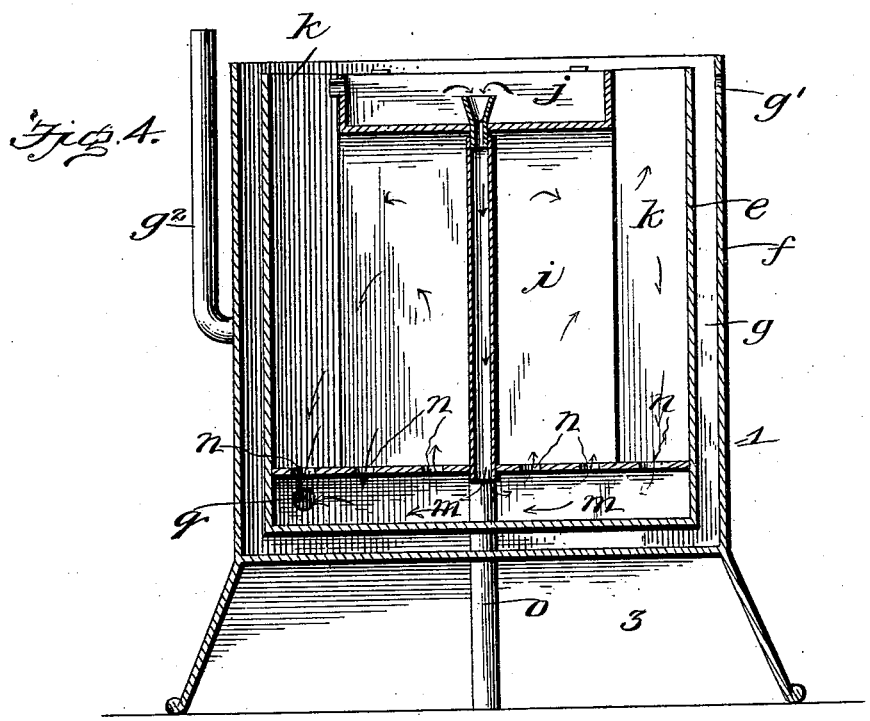
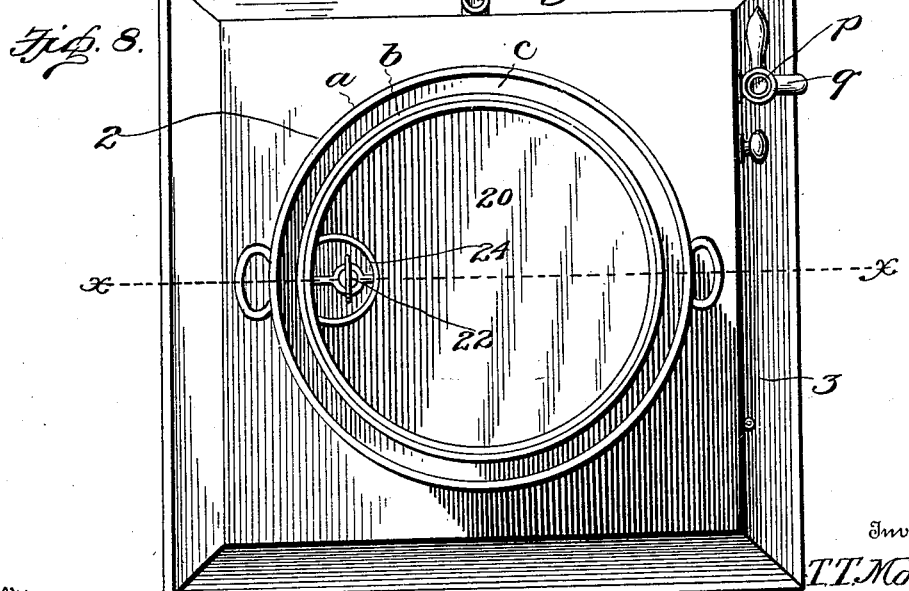
Witnesses
Inventor
T. T. Moulton
By
Attorneys No. 673,722.  
T. T. MOULTON.  
COMBINED WATER COOLER AND FILTER.  
(Application filed Nov. 1, 1900.)  
Patented May 7, 1901.
(No Model.) 4 Sheets—Sheet 4.
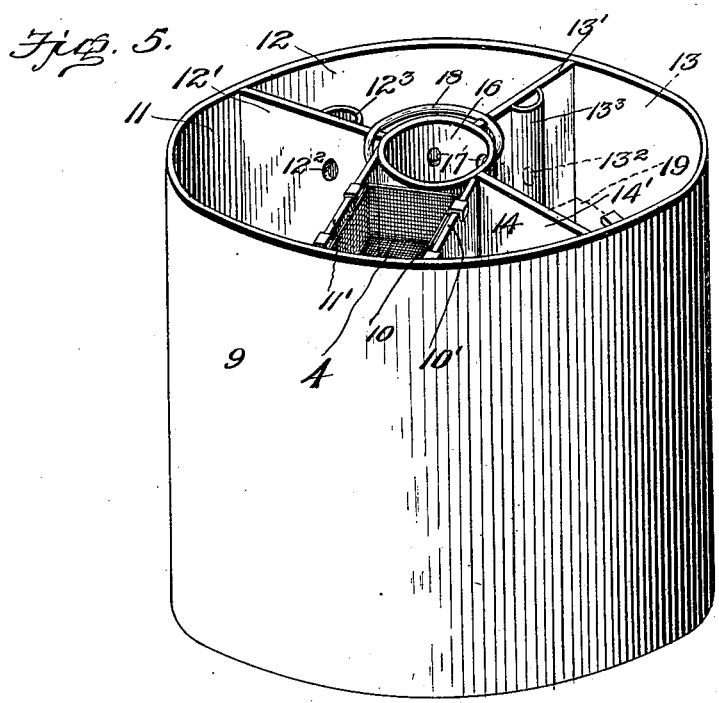
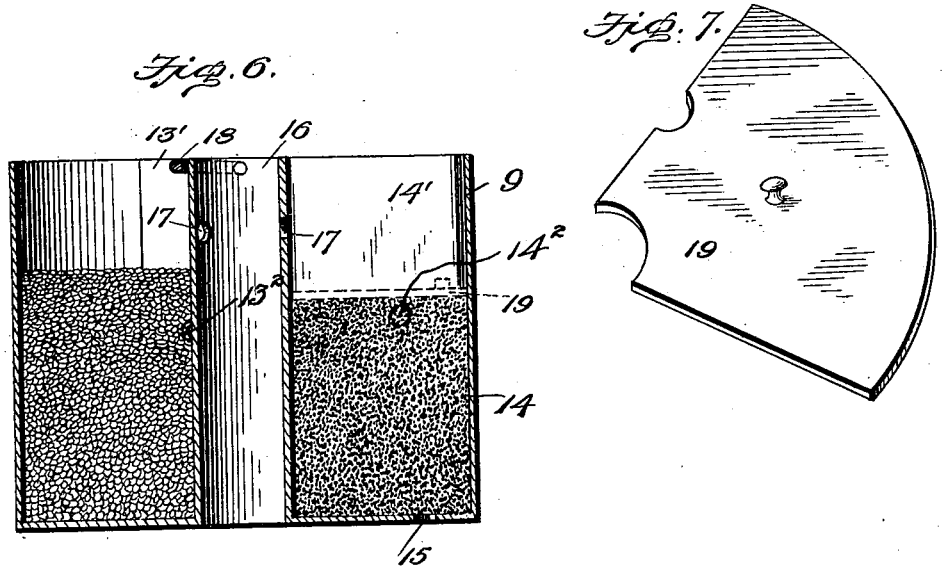
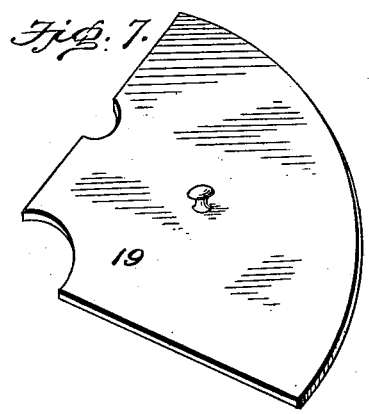

UNITED STATES PATENT OFFICE.

TRUMAN T. MOULTON, OF OSHKOSH, WISCONSIN.

COMBINED WATER COOLER AND FILTER.

SPECIFICATION forming part of Letters Patent No. 673,722, dated May 7, 1901.

Application filed November 1, 1900. Serial No. 35,166. (No model.)

*To all whom it may concern:*

Be it known that I, TRUMAN T. MOULTON, a citizen of the United States, residing at Oshkosh, in the county of Winnebago and State of Wisconsin, have invented certain new and useful Improvements in Filters for Water-Coolers; and I do declare the following to be a full, clear, and exact description of the invention, such as will enable others skilled in the art to which it appertains to make and use the same.

The invention relates to a filter for water-coolers.

The object of the invention is to provide a device of this character which will quickly cool and thoroughly ventilate the water and effectively remove all impurities therefrom, and which shall be of such construction as to permit of its parts being readily removed for the purpose of cleaning or repairing.

To this end the invention consists in certain features of construction and combination of parts, which will be hereinafter fully described and claimed.

Figure 1:
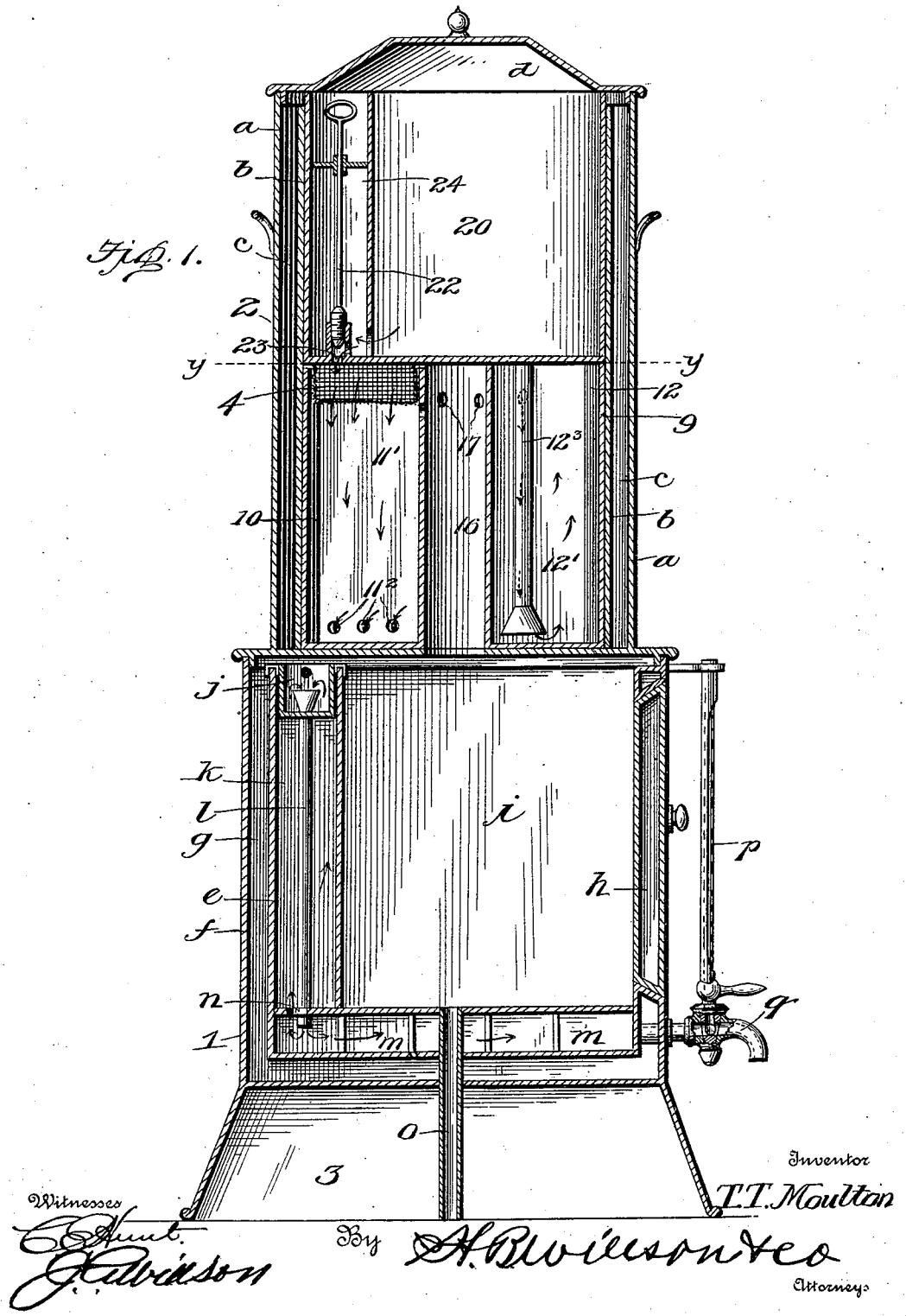
Figure 2:
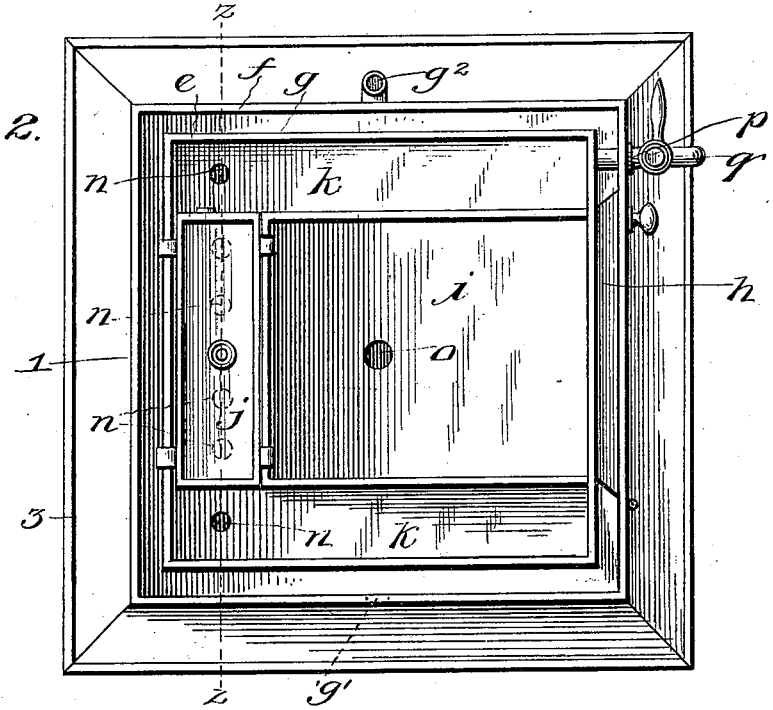
Figure 3:
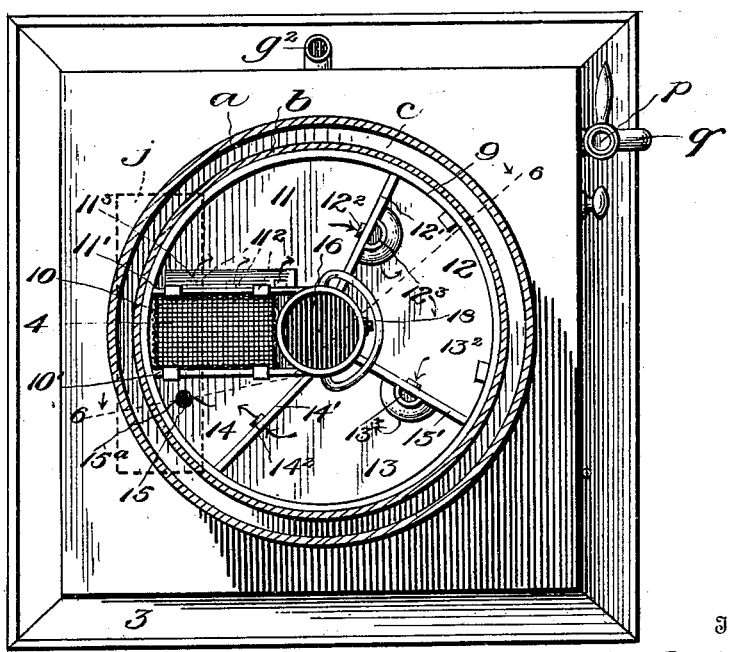

In the accompanying drawings, Figure 1 is a vertical sectional view on the line $x\,x$ of Fig. 8. Fig. 2 is a top plan view of the base-section. Fig. 3 is a sectional view on the line $y\,y$ of Fig. 1 with the filtering-compartments appearing in plan. Fig. 4 is a vertical section on the line $z\,z$ of Fig. 2. Fig. 5 is a detail perspective view of the filtering-section. Fig. 6 is a vertical sectional view on the line 6 6 of Fig. 3 looking in the direction of the arrows. Fig. 7 is a detail perspective view of the cover for the charcoal-compartment of the filtering-section. Fig. 8 is a top plan view of the combined water cooler and filter, the cover being removed.

In the accompanying drawings, 1 denotes the base-section, and 2 the top section. The base-section is preferably polygonal in cross-section and is provided with a supporting-flange 3. The top section preferably consists of two shells $a\,b$ to form a dead-air space $c$, and is provided with a cover $d$. The bottom of the top section extends laterally beyond the sides of said section and forms a cover for the base-section 1. This section 1 consists of an inner and an outer shell $e$ and $f$, respectively, which form a ventilating air-space $g$, this space communicating with the atmosphere through a hole $g'$, located in and near the top edge of one side of the outer shell of said lower section and being provided on the opposite side with a similar hole located at a lower plane than the hole $g'$ and communicating with a vertically-disposed pipe $g^2$, open at its upper end, and which may extend to any desired elevation, thus creating a current or draft of air which, coming into contact with the filtered water in the compartments $k$, will ventilate and freshen the same. The section 1 is further provided with a hinged door $h$ and with an ice-compartment $i$, which is closed by said door.

9 denotes a filtering-section placed within the top section and supported upon the bottom thereof, and 20 denotes the supply receptacle or compartment for containing the unfiltered water. This receptacle is provided with a needle-valve 22 for regulating the flow of water through the discharge-orifice 23 in the bottom of the receptacle. If desired, a shield 24 may be placed around the needle-valve and will prevent the ice, if used in the unfiltered water-compartment, from interfering with the working of the valve.

The filtering-section above referred to is divided into an inlet-compartment 10, filtering-compartments 11, 12, and 13, and a discharge-compartment 14 by partitions $10'$, $11'$, $12'$, $13'$, and $14'$. The inlet-compartment 10 has arranged in its upper end a filter or screen 4, which serves to catch and hold sawdust or impurities in the ice and prevent them from passing into said compartment from the water-receptacle 20. The partition $11'$ is provided with outlet-apertures $11^2$ in its lower end, which apertures communicate with the compartment 11, adapted to contain a filtering material, such as quartz. The water entering the compartment 10 is therefore discharged from said compartment at its lower end and filters upwardly through the filtering material in the compartment 11. The partition $12'$ is provided with a discharge-aperture $12^2$ near its upper end for conducting the partially-filtered water from the compartment 11 to the compartment 12.

$12^3$ denotes a shield or guard which is secured to one side of the partition $12'$ and conducts the water from the aperture $12^2$ to the bottom of the compartment 12, where it is discharged. The water after filtering through the filtering material in the compartment 12 escapes through a hole $13^2$ in the partition 13', said hole being guarded by a shield $13^3$, which conducts water to the bottom of the compartment 13. The hole $13^2$ is slightly lower than the hole $12^2$ in the partition 12'. The water after filtering up through the filtering material in the compartment 13, which material is preferably charcoal, passes out through an aperture $14^2$ in the partition 14' into the compartment 14, which is provided in its bottom with an outlet-hole 15, which communicates with the hole $15^a$ in the bottom of the top section. The inner edge of each partition is joined to a central overflow-tube 16, which is provided with orifices 17 to conduct the water, should it overflow the filtering-compartment, down through said tube into the ice-compartment $i$, as more clearly shown in Fig. 1 of the drawings, there of course being openings in the bottom of the top section and filtering-section communicating with said tube.

18 denotes a bail or handle pivoted to the tube, by means of which the filtering-section may be removed when desired.

19 denotes a cover adapted to be placed over the charcoal-compartment to prevent the charcoal from mixing with the quartz when the filtering-section is removed and its contents discharged for the purpose of washing them. The water discharges from the compartment 14 through the communicating holes 15 and $15^a$ into a settlings basin or trap $j$, supported by the upper end of the base-section, or, more strictly speaking, the upper end of a water-compartment $k$, the inner wall of which is formed by the rear wall of the ice-compartment $i$. A pipe extends vertically through the water-compartment $k$ and has its upper end projecting above the bottom of the basin to receive and convey the water that accumulates in said basin down into a second water-compartment $m$, the upper wall of which is formed by the floor of the ice-compartment $i$. This compartment $m$ communicates with the compartment $k$ through a series of apertures $n$, so that the water discharged into the compartment $m$ may in the filling of said compartment back up into the compartment $k$.

$o$ denotes a drain-pipe for the ice-compartment.

$p$ denotes a sight-tube.

$q$ denotes a draw-off cock.

The mode of operation is as follows: A sufficient quantity of ice is placed within the ice-compartment $i$ and water or water and ice placed in the water-compartment 20. The needle-valve 22 is set to control the escape of the water from said compartment into the filtering-section. The water flowing from said compartment 20 into the filtering-section first passes through the filter or screen 4 and has removed from it sawdust or any other foreign matter of a coarse nature. After passing through the screen 4 it enters the compartment 10 and passes through the apertures $11^2$ at the lower end of the partition 11' of said compartment and through the several filtering-compartments, and finally into the compartment 14. When it reaches this compartment, all the impurities have been removed from the water, and it flows from said compartment into the trap or settlings-basin $j$, when the charcoal, quartz, or other filtering material which has passed from its filtering-compartment with the water will settle at the bottom of the basin and allow the water to escape through the tube $l$ to the water-compartment $m$, which being immediately below the ice in the ice-compartment $i$ will very quickly lower the temperature of the water. Should the water after being cooled in this department $m$ not be drawn off fast enough, it will back up through the perforations $n$ into the compartment $k$, where it will be kept cool by the ice within the compartment $i$.

The lower ends of the shields $12^3$ and $13^3$ are flared to prevent the quartz or other filtering material from working up and filling the holes in the partitions forming the filtering-compartment. To prevent the filtering material from clogging the holes $11^2$, a shed $11^3$ is provided, it being secured to the lower end of the partition 11'. (See Fig. 3.)

All interior parts of the filter with which the water comes in contact may be enameled with any suitable material, but preferably with a preparation made of shellac and alcohol.

From the foregoing description, taken in connection with the accompanying drawings, the construction, operation, and advantages of my invention will be readily understood without requiring an extended explanation. The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In a filter for water-coolers, the combination, with the base-section and the top section, a receiving or filtered-water compartment located in the base-section and an unfiltered-water or supply compartment supported in the top section, of a filtering-section interposed between the unfiltered-water compartment and the filtered-water compartment and provided with filtering-compartments and with inlet and outlet compartments, the inlet-compartment communicating with one of the filtering-compartments and the said filtering-compartments communicating one with the other, substantially as set forth.

2. In a filter for water-coolers, the combination with the base-section and the top section, a receiving or filtered-water compartment located in the base-section and an unfiltered-water or supply compartment supported in the top section, of a filtering-section interposed between the unfiltered-water compartment and the filtered-water compartment and provided with filtering-compartments and with inlet and outlet compartments, the said filtering-compartments communicating one with the other and with the outlet and inlet compartments and said outlet-compartment communicating with the filtered-water compartment, and a central overflow-tube communicating at its upper end with the various compartments to carry off any overflow therefrom, substantially as set forth.

In testimony whereof I have hereunto set my hand in presence of two subscribing witnesses.

TRUMAN T. MOULTON.

Witnesses:
C. R. NEVITT,
DAN LYNCH.